Oct. 1, 1968  A. GERARD  3,404,324
STEP MOTOR POSITION CONTROL WITH ROTARY REED SWITCH TRANSMITTER
Filed July 15, 1964
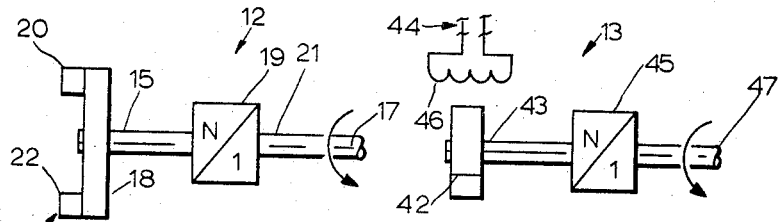
FIG. 2
FIG. 3
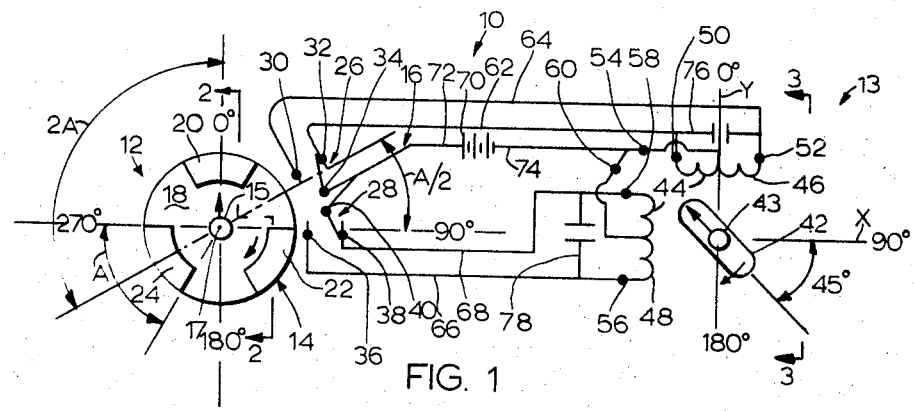
FIG. 1
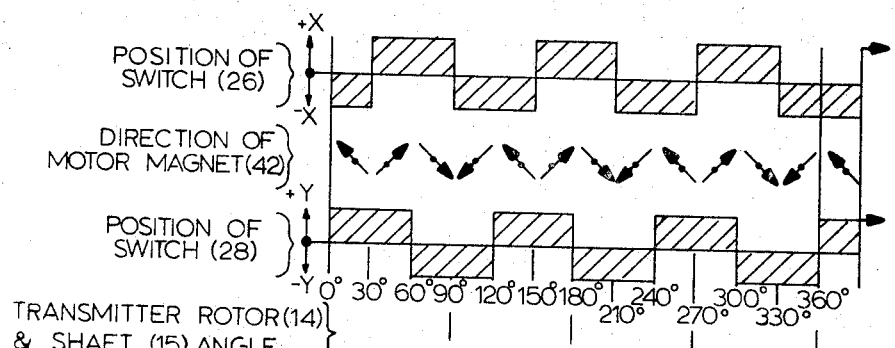
FIG. 4
ALLAN GERARD
INVENTOR.
BY
Thomas W. Kennedy
ATTORNEY

United States Patent Office 3,404,324
Patented Oct. 1, 1968

3,404,324
STEP MOTOR POSITION CONTROL WITH ROTARY REED SWITCH TRANSMITTER
Allan Gerard, Fort Lee, N.J., assignor to General Precision Systems Inc., a corporation of Delaware
Filed July 15, 1964, Ser. No. 382,857
2 Claims. (Cl. 318—27)

ABSTRACT OF THE DISCLOSURE

A shaft angle repeater including a stepper motor with a rotor and windings selectively energized and de-energized in appropriate directions in accordance with the rotation of a shaft. A transmitter at the shaft includes magnet members circumferentially spaced about the shaft and bistable reed switches actuable by both the approach and departure of a magnet to change position. A change in position of a reed switch changes the direction of energization of a motor winding to advance the rotor of the motor.

---

The present invention relates to a shaft angle repeater and particularly to a shaft angle repeater useable in a computer system.

A prior art type of shaft angle repeater has a remote shaft with a separately powered transmitting resolver requiring an AC source and an instrument shaft driven by a separately powered motor with an amplifier requiring a regulated DC source and a receiving resolver, which is operably connected to the transmitting resolver. One objection to such a prior art type of shaft angle repeater is that the amplifier is subject to noise; another objection is that the transmitting resolver and instrument motor require separate, relatively high-level, power inputs and separate AC and DC power input sources.

In accordance with the present invention, a relatively less noisy, less expensive and lower-powered shaft angle repeater is provided, which requires only a single unregulated DC power source. The repeater comprises a step-motor having field windings and a rotor, and a transmitter including bistable switching elements and a rotary switching control therefor. The rotary control has a plurality of switch actuators mounted on its periphery with equi-angular peripheral spacing. The bistable switches are selectively operable to connect a common DC power source to respective windings of the step-motor receiver. The switches are arranged adjacent the peripheral path of the switch actuators for cooperation therewith, the spacing angle between the effective operating positions of the switches being substantially equal to one-half the spacing angle between the switch actuators.

Accordingly, it is one object of the invention to provide a relatively noiseless and inexpensive shaft angle repeater.

It is another object of the invention to provide a shaft angle repeater employing standard reed switches actuated by a magnetic cam.

It is a further object of the invention to provide a low-powered shaft angle repeater.

Other objects of the invention will become apparent upon reading the annexed detail description in connection with the drawings wherein like parts are designated by like numerals throughout the several views, and wherein:

FIG. 1 is a schematic view of a shaft angle repeater embodying features of the present invention;

FIG. 2 is a sectional view taken on line 2—2 of FIG. 1;

FIG. 3 is a sectional view taken on line 3—3 of FIG. 1; and

FIG. 4 is a graph indicating the positions of the transmitter switches and the orientation of the receiver motor plotted versus the transmitter shaft angle.

Referring to FIG. 1, one embodiment of the present invention is a shaft angle repeater or remote angle position indicator 10 comprising a transmitting means 12 and a receiving means 13.

Transmitter 12 has a rotor 14 and a stator 16. Rotor 14, which is a magnetic cam, includes a shaft 15 with an axis 17 journaled in a coaxial discoid member 18, which has three arcuate magnets 20, 22, 24 mounted on one face. In the illustrated embodiment, magnets 20, 22, 24 are arranged approximately at 120° center-to-center spacing with a 60° clear distance between their ends about axis 17, although it will become evident as this description proceeds that the number and spacing of the magnets is a variable factor depending on the particular details of the receiving means 13 and other parameters which will be pointed out presently.

Shaft 15 has a coaxial gear reduction means 19, which is also connected coaxially to a remote shaft 21, whose angle of rotation is to be measured. Stator 16 has a pair of reed switches 26, 28, which are of the two-position or bistable type and which are disposed adjacent the periphery of rotor 14. Switch 26 has two output terminals 30, 32, representing the alternate stable positions of the switch, and a power input terminal 34. Switch 28 similarly has two output terminals 36, 38 and an input terminal 40.

Receiver 13, which is a 90° stepper motor, has a permanent magnet rotor 42, and a wound stator 44. Stator 44 has two coils 46, 48, which are preferably arranged substantially at 90 degrees to each other so to generate flux vectors also substantially at 90 degrees to each other. In FIG. 1, rotor 42 and stator 44 are shown with an X-reference axis and a Y-reference axis for ease of illustration.

Coil 46 has two end terminals 50, 52 at opposite ends thereof, and a center tap 54 which divides coil 44 into two half-windings. In this way, current flow between terminals 52 and 54 causes a flux vector parallel to the X-axis in a positive direction and current flow between terminals 50 and 54 causes a negative flux vector parallel to the X-axis. Coil 48 similarly has end terminals 56, 58, and a center tap 60 similarly dividing coil 48 into two half-windings. Current flow between terminals 58 and 60 causes a positive flux vector parallel to the Y-axis and current flow between terminals 56 and 60 causes a negative flux vector parallel to the Y-axis.

Rotor 42 also has a shaft 43 connected to a gear reduction means 45 which is also connected to an instrument shaft 47. Gear reducer 45 is preferably a type which has a null positioning device (not shown), such as a spring clutch or pendulum counterweight, for positioning magnet 42 in a null orientation when coils 46 and 48 are inactive for a fixed alignment of magnet 42 at start-up.

Switch 26 is connected to coil 46 by lines 62, 64. Line 62 interconnects terminals 32 and 50, and line 64 interconnects terminals 30 and 52. Switch 28 is similarly connected to coil 48 by lines 66, 68. Line 66 interconnects terminals 36 and 56, and line 68 interconnects terminals 38 and 58. With this arrangement of wiring, rotor 42 and rotor 14 both turn in a clockwise direction during operation. Switches 26, 28 are also respectively connected to a power supply 70, which has a common line 72 with branches to terminals 34 and 40. Coils 46, 48 are also respectively connected to power supply 70, which has a return line 74 with branches connecting to ground taps 54 and 60.

Lines 62, 64 have respective portions adjacent terminals 50, 52, which are connected to a capacitor 76 in a conventional arrangement to avoid arcing of their reed switch 26. Lines 66, 68 also have respective portions adjacent their terminals 56, 58 which are connected to a capacitor 78 to avoid arcing of their reed switch 28.

The arrangement of the components of embodiment 10 can be expressed in formulas as follows:

$n$ = the number of arcuate magnets 20, 22, 24

$2n$ = the number of switch actuators where each arcuate magnet 20, 22, 24 has two switch-actuating end portions $A = 360°/2n = 180°/n$ = the angle of the approximate arcuate length of each of the magnets 20, 22, 24

$A = 360°/2n = 180°/n$ = angle of center-to-center spacing of switch actuators $A/2$ = angle of center-to-center spacing of switches 26, 28 of the transmitter stator 16

$2A$ = angle of the center-to-center spacing of the magnets 20, 22, 24

As shown in FIG. 1, rotor 14 and its shaft 15 is assumed to be in a 0° orientation when the center of magnet 20 is vertical. Both rotor 14 and rotor 42 have a clockwise rotation. When one of the magnets 20, 22, 24 is adjacent to a switch 26 or 28, the magnet displaces the switch reed thereby closing the switch terminal nearest to the magnet and opening the switch terminal farthest from the magnet. In this way, the end portions of each magnet 20, 22, 24 actuate the switches 26, 28.

In operation, when rotor 14 is oriented at an angle between about 0° and 30°, terminal 32 of switch 26 is closed causing a minus flux vector in coil 46, and terminal 38 of switch 28 is closed causing a plus flux vector in coil 48, thereby causing magnetic rotor 42 to align itself in the direction of the resultant vector, viz, at 315°. At about 30°, the forward end of magnet 20 comes opposite switch 26 causing terminal 30 to close, and causing terminal 32 to open (FIG. 4).

When rotor 14 is oriented at an angle between about 30° and 60°, terminal 30 is closed causing a plus flux vector in coil 46 and terminal 38 is still closed causing a plus flux vector in coil 48, thereby causing magnetic rotor 42 to assuming the resultant direction of plus 45°. At about 60°, the end of magnet 20 comes opposite switch 28 causing terminal 36 to close and terminal 38 to open.

When rotor 14 is oriented at an angle between about 60° and 90°, terminal 30 is closed causing a plus flux vector in coil 46, and terminal 36 is closed causing a minus flux vector in coil 48, thereby causing magnetic rotor 42 to align itself in the resultant direction of 135°. At about 90°, the rearward end of magnet 20 passes switch 26 causing terminal 32 to close and terminal 30 to open.

When rotor 14 is oriented at an angle between about 90° and 120°, terminal 32 is closed causing a minus flux vector in coil 46 and terminal 36 is closed causing a minus flux vector in coil 48, thereby causing magnetic rotor 42 to assume a position of 225°.

In summary, at 0°–30°, the vectors are minus, plus;
at 30°–60°, the vectors are plus, plus;
at 60°–90°, the vectors are plus, minus; and
at 90°–120°, the vectors are minus, minus;

so that the magnetic rotor 42 revolves once per each 120° rotation of rotor 14, and rotor 42 travels three times faster than rotor 14. Thus, rotor 42 and rotor 14 have a 3 to 1 speed ratio; and shaft 47 and shaft 21 also have a fixed speed ratio.

While the present invention has been described in a preferred embodiment, it will be obvious to those skilled in the art that various modifications can be made therein within the scope of the invention. For example, by reversing lines 62 and 64 at terminals 50 and 52, rotor 42 can be made to rotate counterclockwise instead of clockwise. In addition, a single arcuate magnet can be used on gear blank 18 thereby giving a 1 to 1 speed ratio between shaft 15 and shaft 43.

While the invention has been described in detail as employed with a 90° stepper motor, it will be understood that this simplest case was selected for ease of explanation and solely for purposes of example. The system can be adapted and/or expanded to operate with stepper motors capable of larger numbers of steps per revolutions (e.g., 45°, 22½° stepper motors) and motors having a larger number windings, including variable-reluctance type motors. Generally speaking, it would be necessary to provide one bistable switch for each winding employed in the stepper motor, although it will be apparent to persons skilled in the art that a large number of specific embodiments can be devised by application of the principles set forth hereinabove. It is intended, therefore, that the scope of the invention be limited only to the extent defined in the subjoined claims which are intended to cover all modifications obvious to persons skilled in the art.

What is claimed and desired to be protected by United States Letters Patent is:

1. A remote angle position indicator comprising:
    a step-motor receiver with field windings and a rotor; and
    a transmitter with a stator and rotor,
    said transmitter rotor having a plurality of switch actuators mounted on its periphery, said switch actuators comprising three arcuate magnet poles of substantially equiangular length and spacing and having switch-actuating end portions wherein the angle subtended by the arcuate length of each magnet is substantially equal to 60° and the center-to-center spacing angle between adjacent magnetics is substantially equal to 120°,
    said transmitter stator having a plurality of bi-stable switches selectively operable to connect one end of respective of said windings of the step motor to a direct potential source and substantially simultaneously to disconnect the other end of such winding from said source, said switches being arranged adjacent the peripheral path of the switch actuators wherein the spacing angle between the effective switching positions thereof is substantially equal to one-half of the angle subtended by each switch actuator, and
    said step motor is a 90° type of step motor whereby the rotor speed thereof is three times the transmitter rotor speed.

2. The indicator as claimed in claim 1, in which the receiver and transmitter rotors have respective coaxial shafts with gear reducing means.

References Cited

UNITED STATES PATENTS

| | | | |
|---|---|---|---|
| 2,994,813 | 8/1961 | Towner et al. | 310—49 X |
| 3,187,244 | 6/1965 | Summerer | 318—27 |
| 3,328,659 | 6/1967 | Ryno | 318—138 |

ORIS L. RADER, *Primary Examiner.*

THOMAS E. LYNCH, *Assistant Examiner.*